(12) United States Patent
Kaneta

(10) Patent No.: US 11,095,199 B2
(45) Date of Patent: Aug. 17, 2021

(54) ROTATING ELECTRICAL MACHINE UNIT AND RESOLVER STATOR

(71) Applicant: HONDA MOTOR CO., LTD., Tokyo (JP)

(72) Inventor: Kazuya Kaneta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 91 days.

(21) Appl. No.: 16/750,767

(22) Filed: Jan. 23, 2020

(65) Prior Publication Data

US 2020/0244151 A1    Jul. 30, 2020

(30) Foreign Application Priority Data

Jan. 29, 2019    (JP) .............................. JP2019-013282

(51) Int. Cl.
*H02K 11/21*    (2016.01)
*H02K 24/00*    (2006.01)

(52) U.S. Cl.
CPC ............. *H02K 24/00* (2013.01); *H02K 11/21* (2016.01)

(58) Field of Classification Search
CPC .. H02K 5/00; H02K 5/08; H02K 5/10; H02K 5/17; H02K 5/173; H02K 5/12; H02K 5/22; H02K 5/225; H02K 11/00; H02K 11/21; H02K 11/22; H02K 11/225; H02K 11/33; H02K 24/00; G01P 3/00; G01P 3/48; G01P 3/488; G01D 5/00; G01D 5/20; G01D 5/24; G01D 5/245
See application file for complete search history.

(56) References Cited

U.S. PATENT DOCUMENTS

| 2008/0258585 | A1  | 10/2008 | Kataoka et al. |            |
|--------------|-----|---------|----------------|------------|
| 2010/0289354 | A1* | 11/2010 | Ishizue        | H02K 5/225 |
|              |     |         |                | 310/71     |
| 2013/0134841 | A1* | 5/2013  | Nishikawa      | H02K 11/33 |
|              |     |         |                | 310/68 B   |
| 2014/0097712 | A1* | 4/2014  | Kozaka         | H02K 9/19  |
|              |     |         |                | 310/52     |
| 2015/0162798 | A1* | 6/2015  | Ozawa          | H02K 5/161 |
|              |     |         |                | 310/43     |

FOREIGN PATENT DOCUMENTS

JP    2008-268065 A    11/2008

* cited by examiner

*Primary Examiner* — Tran N Nguyen
(74) *Attorney, Agent, or Firm* — Paratus Law Group, PLLC

(57) ABSTRACT

A rotating electrical machine unit includes: a rotating electrical machine; a resolver which includes a resolver rotor and a resolver stator; and a case which accommodates the rotating electrical machine and the resolver. The resolver stator includes: a stator portion; a telegraph connector portion; and a first positioning portion including a knock portion protruding to one side. The telegraph connector portion includes a second positioning portion having a fitting portion having a sealing member on an outer peripheral surface. The resolver stator is attached to the case by being positioned with the knock portion of the first positioning portion being fixed to a knock fixing portion of the case and the fitting portion of the second positioning portion being fitted into a mounting hole of the case.

8 Claims, 4 Drawing Sheets

ROTATING ELECTRICAL MACHINE UNIT AND RESOLVER STATOR

CROSS-REFERENCE TO RELATED APPLICATIONS

The present application claims the benefit of priority of Japanese Patent Application No. 2019-013282, filed on Jan. 29, 2019, the content of which is incorporated herein by reference.

TECHNICAL FIELD

The present invention relates to a rotating electrical machine unit including a rotating electrical machine and a resolver and a resolver stator.

BACKGROUND ART

In recent years, a rotational angle sensor such as a resolver has been used to detect the rotational position of a rotating electrical machine. For example, in JP-A-2008-268065, a resolver which includes a resolver rotor fixed to a rotating shaft of a rotating electrical machine and a resolver stator arranged to surround a radial outer side of resolver rotor and fixed to a case of the rotating electrical machine is disclosed.

This type of resolver detects the rotational angle of the resolver rotor by utilizing the fact that the gap permeance constituted of the resolver rotor and resolver stator varies sinusoidally with the rotation of the resolver rotor. Therefore, it is required to install the resolver rotor and resolver stator with high positional accuracy.

However, in JP-A-2008-268065, the resolver stator is attached to a bracket including a bearing and the bracket is fixed to a case via a rubber bush. Therefore, it is difficult to attach the resolver stator to the case with high positional accuracy.

SUMMARY

The invention provides a rotating electrical machine unit and a resolver stator with improved mounting position accuracy when a resolver stator is mounted.

According to an aspect of the invention, there is provided a rotating electrical machine unit including: a rotating electrical machine having a rotating shaft; a resolver which includes a resolver rotor attached to the rotating shaft or a rotating member which rotates together with the rotating shaft and a resolver stator arranged so as to surround a radial outer side of the resolver rotor; and a case which accommodates the rotating electrical machine and the resolver, wherein: the resolver stator includes: a stator portion having a substantially annular shape disposed opposite to the radially outer side of the resolver rotor; a telegraph connector portion extending radially outward from the stator portion and protruding to one side in a direction of the rotating shaft; and a first positioning portion extending radially outward from the stator portion and including a knock portion protruding to the one side; the case has a mounting hole through which the telegraph connector portion passes and a knock fixing portion to which the knock portion is fixed; the telegraph connector portion includes a second positioning portion having a fitting portion fitted to the mounting hole and having a sealing member on an outer peripheral surface and an external connection portion protruding from the second positioning portion to the outside of the case on the one side; and the resolver stator is attached to the case by being positioned with the knock portion of the first positioning portion being fixed to the knock fixing portion of the case and the fitting portion of the second positioning portion being fitted into the mounting hole of the case.

According to another aspect of the invention, there is provided a resolver stator, including: a stator portion having a substantially annular shape; a telegraph connector portion extending radially outward from the stator portion and protruding to one side in a central axis direction of the stator portion; and a first positioning portion extending radially outward from the stator portion and including a knock portion protruding to the one side, wherein the telegraph connector portion includes a second positioning portion having a fitting portion with a sealing member on an outer peripheral surface and an external connection portion protruding from the second positioning portion to the one side.

EFFECTS

According to the invention, the mounting position accuracy when a resolver stator is mounted is improved.

DESCRIPTION OF EMBODIMENTS

Hereinafter, an embodiment of a rotating electrical machine unit of the invention will be described with reference to the accompanying drawings.

Figure 1:
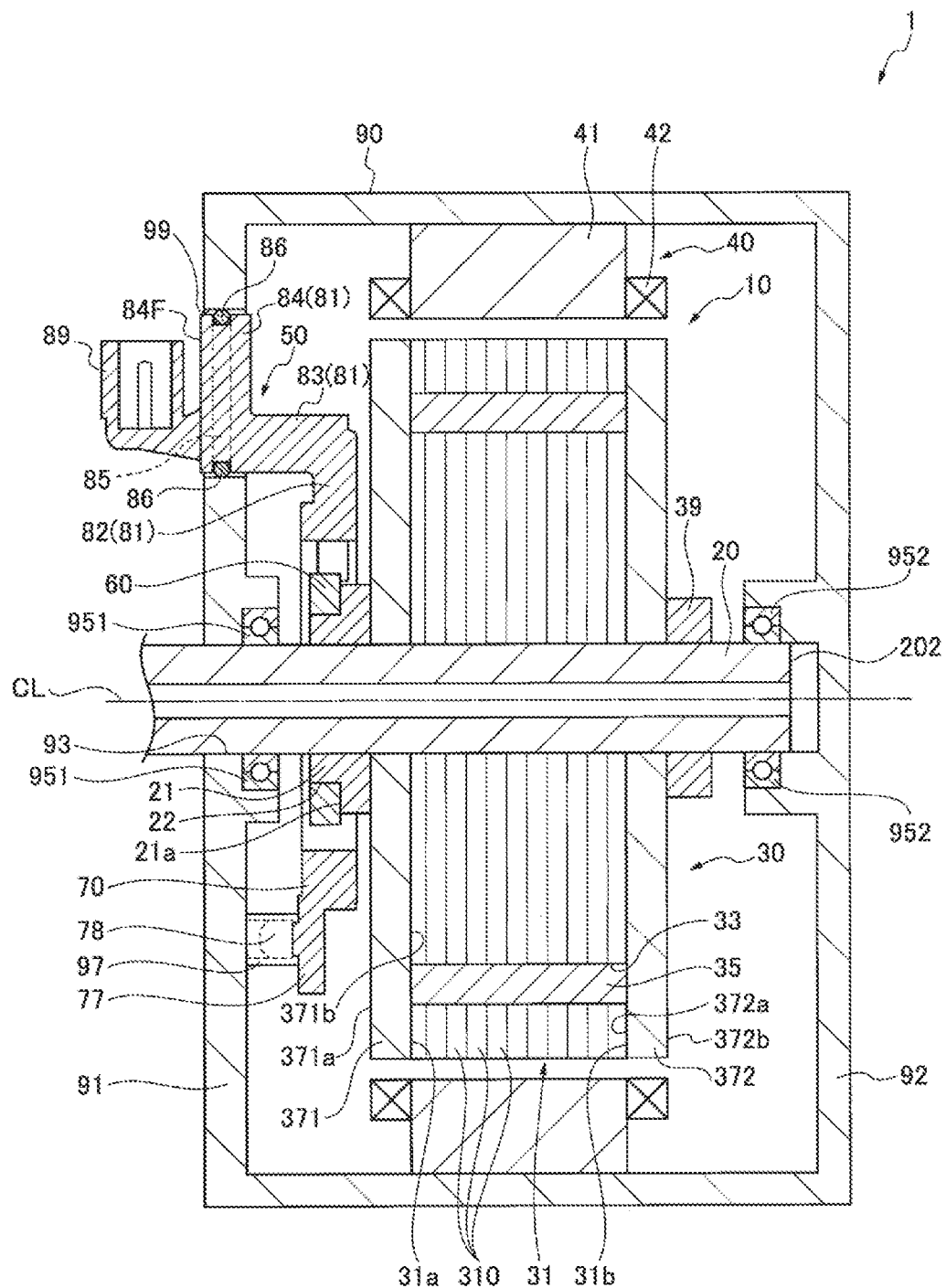
FIG. 1 is a cross-sectional view schematically showing a main part of a rotating electrical machine unit according to the invention.

As illustrated in FIG. 1, a rotating electrical machine unit 1 according to the embodiment includes a rotating electrical machine 10, a resolver 50, and a case 90 which accommodates the rotating electrical machine 10 and the resolver 50.

The rotating electrical machine 10 includes a rotating shaft 20, a rotor 30 having a substantially annular shape and fixed to an outer peripheral surface of the rotating shaft 20, and a stator 40 arranged to face an outer peripheral surface of the rotor 30.

The rotating shaft 20 is an output shaft of the rotating electrical machine 10. In the rotating shaft 20, a first end portion (not illustrated) protrudes from the case 90 and outputs a rotational power of the rotating electrical machine 10 to the outside and a second end portion 202 is accommodated in the case 90. Hereinafter, the first end portion side in an axial direction of the rotating shaft 20 is referred to as the output side and the second end portion 202 side is referred to as the shaft end side.

On the outer periphery of the rotating shaft 20, there are provided a flange 21 having a substantially annular shape which expands in a radial direction and a resolver rotor fixing portion 22. The resolver rotor fixing portion 22 has a smaller diameter than the flange 21 and protrudes from an output side end surface 21a of the flange 21 toward the axial output side.

The rotor 30 has a substantially annular shape and includes a rotor core 31 in which a plurality of magnet insertion holes 33 parallel to a rotation axis CL of the rotating shaft 20 are provided on the outer peripheral side along a circumferential direction, a permanent magnet 35 inserted into each magnet insertion hole 33, an output side end surface plate 371 and a shaft end side end surface plate 372 disposed on both axial end surfaces of the rotor core 31, and a collar 39.

The rotor core 31 is constituted by laminating a plurality of electromagnetic steel plates 310 in the axial direction.

The output side end surface plate 371 and the shaft end side end surface plate 372 both have a substantially annular shape which is substantially the same as the rotor core 31 in the radial direction. In the output side end surface plate 371, the output side end surface 371a abuts on the flange 21 of the rotating shaft 20 and the shaft end side end surface 371b abuts on the output side end surface 31a of the rotor core 31, so that the output side end surface plate 371 restrains the rotor core 31 from being displaced toward the output side. In the shaft end side end surface plate 372, an output side end surface 372a abuts on the shaft end side end surface 31b of the rotor core 31, so that the shaft end side end surface plate 372 restrains the rotor core 31 from being displaced in a direction of the output side.

The collar 39 abuts on a shaft end side end surface 372b of the shaft end side end plate 372 and is fixed to the outer peripheral surface of the rotating shaft 20. Further, the collar 39 presses the output side end surface plate 371, the rotor core 31, and the shaft end side end surface plate 372 to the output side. Thus, the rotor 30 is interposed between the flange 21 of the rotating shaft 20 and the collar 39 and fixed to the rotating shaft 20 in an axial direction.

The stator 40 has a substantially annular shape and includes a stator core 41 having a plurality of tooth portions (not illustrated) provided annularly on the inner peripheral surface and coils 42 formed by winding a plurality of U-phase, V-phase, and W-phase windings around the tooth portions. Electric power is supplied to the coil 42.

The resolver 50 includes a resolver rotor 60 attached to the rotating shaft 20 and a resolver stator 70 attached to the case 90.

The resolver rotor 60 is formed of, for example, an electromagnetic steel tubular member (electromagnetic steel pipe). An electromagnetic steel pipe is a steel pipe with excellent magnetic properties. The resolver rotor 60 is fixed to the resolver rotor fixing portion 22 of the rotating shaft 20 by, for example, press-fitting.

Figure 2:
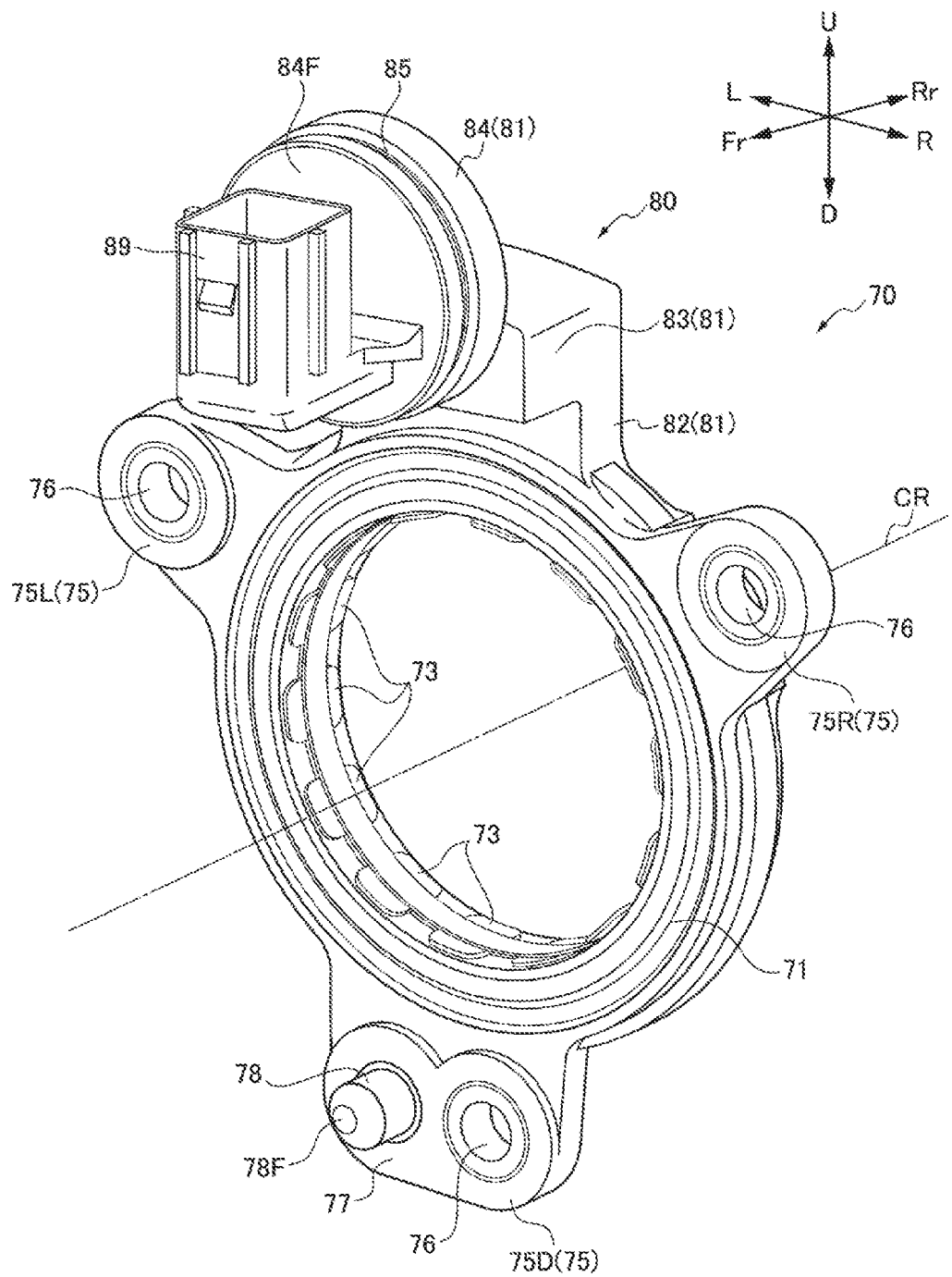
FIG. 2 is a perspective view of a resolver stator of the rotating electrical machine unit according to the invention.
Figure 3:
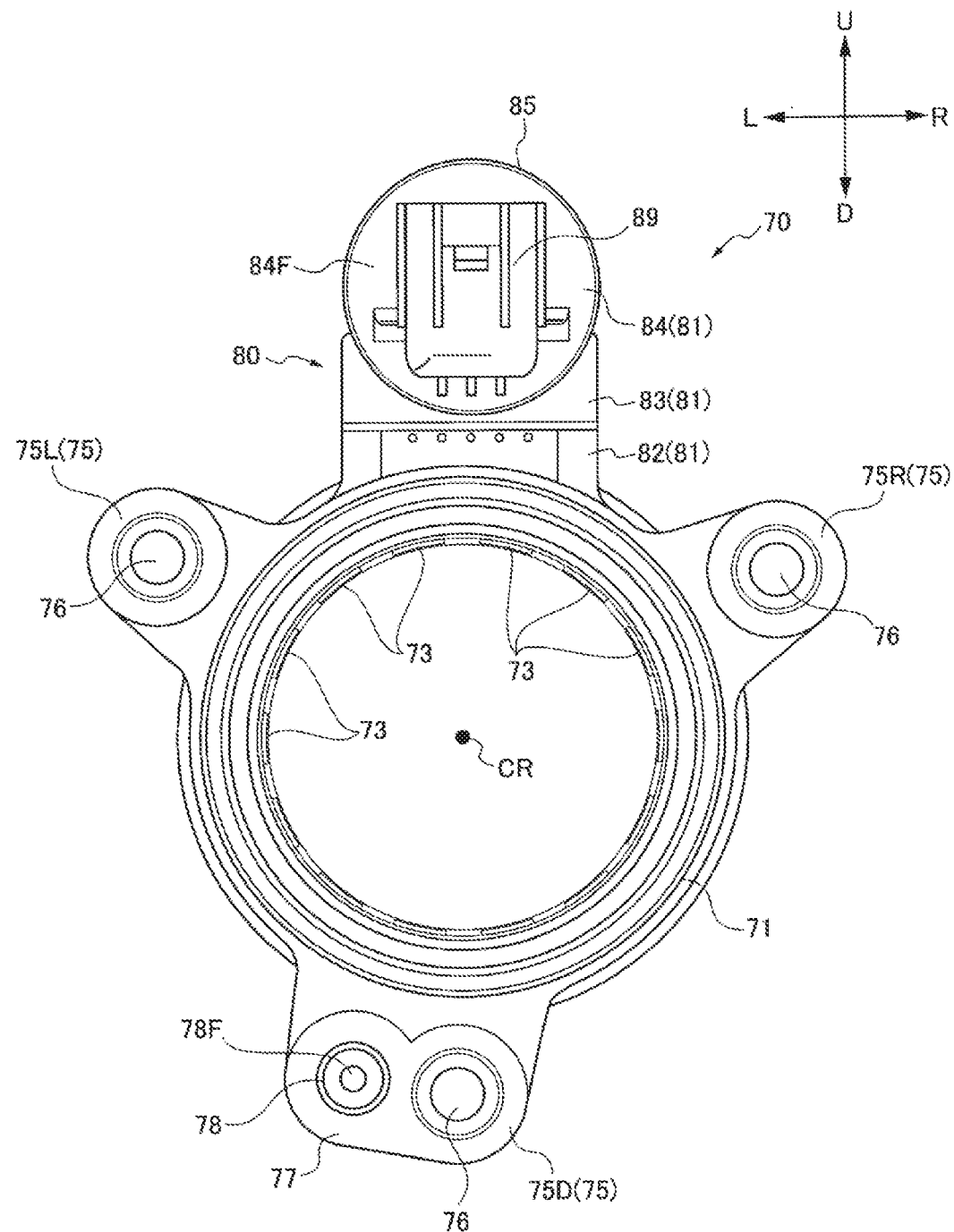
FIG. 3 is a front view of the resolver stator of the rotating electrical machine unit of the invention.
Figure 4:
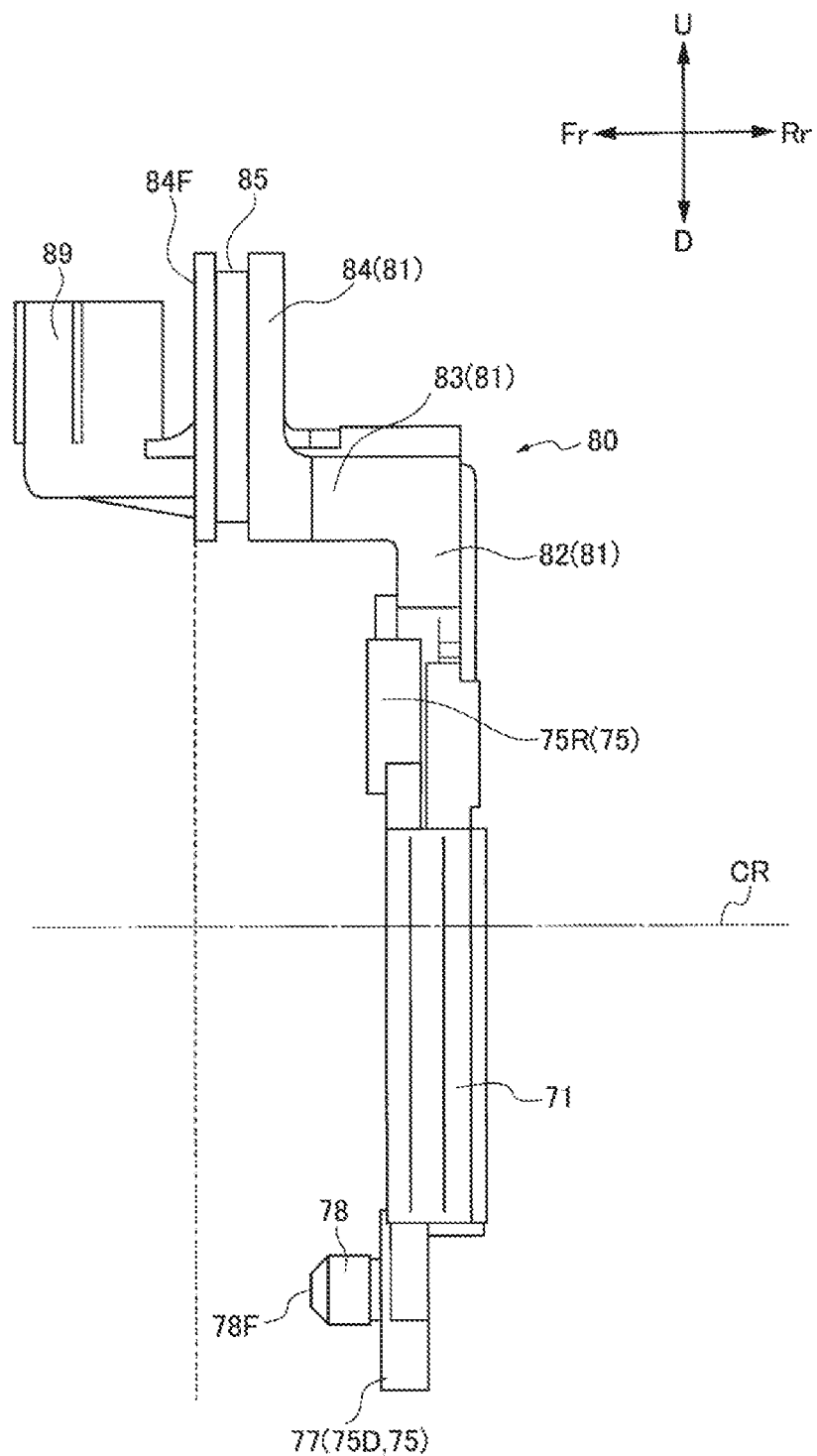
FIG. 4 is a side view of the resolver stator of the rotating electrical machine unit of the invention.

As illustrated in FIGS. 2 to 4, the resolver stator 70 includes a stator portion 71 which is disposed opposite to the radially outer side of the resolver rotor 60 and has a substantially annular shape with a center axis CR as the center of the annular shape and a telegraph connector portion 80 which extends radially outward from the stator portion 71 and protrudes to the axial output side.

In this specification, for the sake of simplicity and clarity, the direction in which the telegraph connector portion 80 of the resolver stator 70 is disposed is defined as an upward direction and the central axis direction of the resolver stator 70 is defined as a front-rear direction. Also, this is independent of the direction of a product in which the rotating electrical machine 10 is mounted. In the drawing, the upper side of the resolver stator 70 is indicated by U, the lower side is indicated by D, the front side is indicated by Fr, the rear side is indicated by Rr, the left side is indicated by L, and the right side is indicated by R.

The inner peripheral surface of the stator portion 71 is provided with a plurality of detection portions 73 which are formed so as to extend radially inward and are arranged annularly in a circumferential direction. In the embodiment, fourteen detection portions 73 are arranged annularly in the circumferential direction along the inner peripheral surface of the stator portion 71. A coil (not illustrated) is disposed in each detection portion 73 inside the stator portion 71.

The outer peripheral surface of the stator portion 71 is provided with a plurality of fastening portions 75 formed so as to extend radially outward and having bolt insertion holes 76 penetrating in a central axis direction. In the embodiment, a total of three fastening portions 75, that is, a fastening portion 75D extending downward and radially outward from the outer peripheral surface of the stator portion 71, a fastening portion 75L extending toward the upper left side and radially outward, and a fastening portion 75R extending toward the upper right side and radially outward, are formed, are formed.

On the outer peripheral surface of the stator portion 71, there is provided a first positioning portion 77 which is formed so as to extend radially outward and includes a knock portion 78 protruding forward. In the embodiment, the knock portion 78 has a pin shape protruding forward. In the embodiment, the first positioning portion 77 is formed integrally with the fastening portion 75D extending downward and radially outward.

The telegraph connector portion 80 includes a second positioning portion 81 which extends upward and radially outward from the outer peripheral surface of the stator portion 71 and an external connection portion 89 which protrudes forward from the second positioning portion 81. The telegraph connector portion 80 is formed integrally with the stator portion 71.

The second positioning portion 81 of the telegraph connector portion 80 includes an upward extension portion 82 extending upward and radially outward from the outer peripheral surface of the stator portion 71, a front extension portion 83 extending in the axial direction from the upper side of the upward extension portion 82 to the front side, and a fitting portion 84 having a substantially disc-shape and formed on the front surface of the front extension portion 83.

A seal groove 85 having a substantially annular shape is formed on the outer peripheral surface of the substantially disc-shaped fitting portion 84 along the outer peripheral surface and a sealing member 86 (see FIG. 1) having a substantially annular shape is provided in the seal groove 85.

The external connection portion 89 of the telegraph connector portion 80 is formed so as to protrude forward from a front end portion 84F of the substantially disc-shaped fitting portion 84 of the second positioning portion 81. The external connection portion 89 of the telegraph connector portion 80 includes a terminal portion (not illustrated) which is electrically connected to a coil disposed inside the stator portion 71. By connecting a wire harness or the like to the external connection portion 89 of the telegraph connector portion 80, electric power is supplied from the external control unit or the like to the coil disposed inside the stator portion 71 via a terminal portion.

When an electric current is supplied to the coil 42 of the stator 40 of the rotating electrical machine 10, the rotor 30 rotates, and the rotating shaft 20 and the resolver rotor 60 rotate as the rotor 30 rotates.

The resolver rotor 60 has a thick portion (not illustrated) having a long radial length and a thin portion (not illustrated) having a short radial length. When the resolver rotor 60 rotates, the gap between the resolver rotor 60 and the resolver stator 70 changes. When an electric current is supplied to the coil of the resolver stator 70, a magnetic field is formed and the amount of the magnetic flux changes from place to place according to the rotation of the resolver rotor

60. By detecting this change in the magnetic flux with the detection portion 73 of the resolver stator 70, the rotation angle of the rotating shaft 20 can be obtained.

As illustrated in FIG. 4, a front end portion 78F of the knock portion 78 of the first positioning portion 77 and the front end portion 84F of the fitting portion 84 of the second positioning portion 81 are arranged at different positions in the front-rear direction. In the embodiment, the front end portion 84F of the fitting portion 84 of the second positioning portion 81 is disposed further on the front side than the front end portion 78F of the knock portion 78 of the first positioning portion 77.

Returning to FIG. 1, the case 90 includes a first end wall portion 91 which forms an end wall surface on the output side and a second end wall portion 92 which forms an end wall surface on the shaft end side.

In the first end wall portion 91 of the case 90, a shaft hole 93 through which the rotating shaft 20 of the rotating electrical machine 10 is inserted, a first bearing 951 provided on the inner peripheral surface of the shaft hole 93, a knock fixing portion 97 to which the knock portion 78 of the first positioning portion 77 of the resolver stator 70 is fixed, and a mounting hole 99 in which the telegraph connector portion 80 of the resolver stator 70 penetrates and the fitting portion 84 of the second positioning portion 81 of the telegraph connector portion 80 fits are provided. In the embodiment, the knock fixing portion 97 has a concave shape having substantially the same cross section as the knock portion 78 of the first positioning portion 77.

The second end wall portion 92 of the case 90 is provided with a second bearing 952 at a position facing the first bearing 951 provided on the first end wall portion 91.

Rotating Electrical Machine Unit

In the rotating electrical machine unit 1, the rotating electrical machine 10 and the resolver 50 are accommodated in the case 90.

The rotating shaft 20 of the rotating electrical machine 10 is rotatably supported by the first bearing 951 and the second bearing 952 of the case 90. The second end portion 202 of the rotating shaft 20 is rotatably supported by the second bearing 952 and is accommodated in the case 90.

Therefore, the rotor 30 of the rotating electrical machine 10 and the resolver rotor 60 of the resolver 50 which are fixed to the rotating shaft 20 are also accommodated in the case 90 so as to be rotatable together with the rotating shaft 20.

The stator 40 of the rotating electrical machine 10 is disposed so as to face the outer peripheral surface of the rotor 30 and is fixed to the case 90.

The resolver stator 70 of the resolver 50 is fixed to the case 90 in a state where the resolver stator 70 is arranged so as to face the outer peripheral surface of the resolver rotor 60 and the center axis CR is aligned with the rotation axis CL of the rotating shaft 20 of the rotating electrical machine 10.

The resolver stator 70 of the resolver 50 is arranged so that the front side faces the first end wall portion 91 of the case 90. The resolver stator 70 is positioned by fixing the knock portion 78 of the first positioning portion 77 to the knock fixing portion 97 of the case 90 and fitting the fitting portion 84 of the second positioning portion 81 into the mounting hole 99 of the case 90. Further, the resolver stator 70 is attached to the case 90 by bolts (not illustrated) which pass through bolt insertion holes 76 of the fastening portions 75. In the embodiment, the knock portion 78 having a pin shape protrudes toward the output side and is fixed to the knock fixing portion 97 by being fitted to the knock fixing portion 97 having a concave shape. Further, a portion between the outer peripheral surface of the fitting portion 84 of the second positioning portion 81 and the inner peripheral surface of the mounting hole 99 of the case 90 is sealed by a substantially annular sealing member 86 provided in the seal groove 85 of the outer peripheral surface of the fitting portion 84.

As a result, the resolver stator 70 is positioned with respect to the case 90 at two locations of the knock portion 78 of the first positioning portion 77 and the fitting portion 84 of the second positioning portion 81, and thus the mounting position accuracy when the resolver stator 70 is mounted to the case 90 is improved compared to a case where positioning is performed at a single location.

Further, the resolver stator 70 is positioned with respect to the case 90 by the fitting portion 84 of the second positioning portion 81. In other words, the fitting portion 84 of the second positioning portion 81 is fitted into the mounting hole 99 of the case 90 in a state where the fitting portion 84 is positioned with respect to the case 90. Accordingly, since the mounting position accuracy of the fitting portion 84 is improved, the gap for absorbing the dimensional tolerance provided between the outer peripheral surface of the fitting portion 84 and the inner peripheral surface of the mounting hole 99 of the case 90 can be reduced. As a result, the sealing performance between the outer peripheral surface of the fitting portion 84 and the inner peripheral surface of the mounting hole 99 of the case 90 by the sealing member 86 is improved and the crushing margin of the sealing member 86 is reduced, and further deterioration of the sealing member 86 can be suppressed.

Further, when seen from the direction of the center axis CR of the rotating shaft 20 of the rotating electrical machine 10 and the resolver stator 70, the knock portion 78 of the first positioning portion 77 is provided on an opposite side to the fitting portion 84 of the second positioning portion 81 with respect to the center axis CR of the rotating shaft 20 of the rotating electrical machine 10 and the resolver stator 70. Therefore, the distance between the knock portion 78 of the first positioning portion 77 and the fitting portion 84 of the second positioning portion 81 is long. This improves the positioning accuracy when the resolver stator 70 is attached to the case 90. In the embodiment, when seen from the direction of the center axis CR of the rotating shaft 20 of the rotating electrical machine 10 and the resolver stator 70, the knock portion 78 of the first positioning portion 77 is provided at a position substantially symmetrical to the fitting portion 84 of the second positioning portion 81 with respect to the center axis CR of the rotating shaft 20 of the rotating electrical machine 10 and the resolver stator 70. Therefore, the distance between the knock portion 78 of the first positioning portion 77 and the fitting portion 84 of the second positioning portion 81 is long, and thus the positioning accuracy when the resolver stator 70 is attached to the case 90 is further improved.

Further, the front end portion 84F of the fitting portion 84 of the second positioning portion 81 is arranged to be located further on the front side than the front end portion 78F of the knock portion 78 of the first positioning portion 77. Therefore, when attaching the resolver stator 70 to the case 90, first, the front end portion 78F of the knock portion 78 of the first positioning portion 77 is slightly inserted into the knock fixing portion 97 of the case 90, and then the mounting position of the fitting portion 84 of the second positioning portion 81 can be positioned in a state where the mounting position of the knock portion 78 of the first positioning portion 77 is provisionally determined. Thus, it is not necessary to simultaneously perform the operation of fixing the knock portion 78 of the first positioning portion 77 to the knock fixing portion 97 of the case 90 and the operation of fitting the fitting portion 84 of the second positioning portion 81 to the mounting hole 99 of the case 90 and those operations can be performed separately. As a result, the operation of attaching the resolver stator 70 to the case 90 becomes easy.

The external connection portion 89 of the telegraph connector portion 80 of the resolver stator 70 is disposed so as to protrude from the front end portion 84F of the fitting portion 84 to the output side toward the outside of the case 90. As a result, the external connection portion 89 of the telegraph connector portion 80 can be connected to a wire harness or the like outside the rotating electrical machine unit 1.

In addition, the invention is not limited to the embodiment described above and modifications, improvements, and the likes can be made as appropriate.

For example, in the embodiment, the resolver rotor 60 is fixed to the resolver rotor fixing portion 22 of the rotating shaft 20. However, it may not be directly attached to the rotating shaft 20 and may be attached to a rotating member which rotates integrally with the rotating shaft 20.

For example, in the embodiment, the knock portion 78 of the first positioning portion 77 has a pin shape and the knock fixing portion 97 of the case 90 has a concave shape, and further the resolver stator 70 is positioned with respect to the case 90 by fitting the knock portion 78 to the knock fixing portion 97. However, the knock portion 78 of the first positioning portion 77 has a concave shape recessed in the central axis direction and the knock fixing portion 97 of the case 90 has a pin shape protruding in the central axis direction, and further the resolver stator 70 may be positioned with respect to the case 90 by fitting the knock portion 78 to the knock fixing portion 97. Also, in this case, the resolver stator 70 is positioned at two locations of the case 90 with the knock portion 78 of the first positioning portion 77 and the fitting portion 84 of the second positioning portion 81, and thus the mounting position accuracy when the resolver stator 70 is mounted to the case 90 is improved.

Further, for example, in the embodiment, the front end portion 84F of the fitting portion 84 of the second positioning portion 81 is arranged to be located further on the front side than the front end portion 78F of the knock portion 78 of the first positioning portion 77. However, the front end portion 78F of the knock portion 78 of the first positioning portion 77 may be arranged to be located further on the front side than the front end portion 84F of the fitting portion 84 of the second positioning portion 81. Also, in this case, the operation of fixing the knock portion 78 of the first positioning portion 77 to the knock fixing portion 97 of the case 90 and the operation of fitting the fitting portion 84 of the second positioning portion 81 to the mounting hole 99 of the case 90 are performed separately. As a result, it becomes easy to attach the resolver stator 70 to the case 90.

In addition, at least the following matters are described in this specification. Further, although the components or the likes which correspond to those in the embodiment described above are shown in a parenthesis, it is not limited to this.

(1) A rotating electrical machine unit (rotating electrical machine unit 1) which includes a rotating electrical machine (rotating electrical machine 10) having a rotating shaft (rotating shaft 20), a resolver (resolver 50) which includes a resolver rotor (resolver rotor 60) attached to the rotating shaft or a rotating member which rotates together with the rotating shaft and a resolver stator (resolver stator 70) arranged so as to surround a radial outer side of the resolver rotor, and a case (case 90) which accommodates the rotating electrical machine and the resolver, in which the resolver stator includes, a stator portion (stator portion 71) having a substantially annular shape disposed opposite to the radially outer side of the resolver rotor.

a telegraph connector portion (telegraph connector portion 80) extending radially outward from the stator portion and protruding to one side (output side) in a direction of the rotating shaft, and a first positioning portion (first positioning portion 77) extending radially outward from the stator portion and including a knock portion (knock portion 78) protruding to the one side, the case has a mounting hole (mounting hole 99) through which the telegraph connector portion passes and a knock fixing portion (knock fixing portion 97) to which the knock portion is fixed, the telegraph connector portion includes a second positioning portion (second positioning portion 81) having a fitting portion (fitting portion 84) fitted to the mounting hole and having a sealing member (sealing member 86) on an outer peripheral surface and an external connection portion (external connection portion 89) protruding from the second positioning portion to the outside of the case on the one side, and the resolver stator is attached to the case by being positioned with the knock portion of the first positioning portion being fixed to the knock fixing portion of the case and the fitting portion of the second positioning portion being fitted into the mounting hole of the case.

According to (1), since the resolver stator is attached to the case by being positioning with the knock portion of the first positioning portion being fixed to the knock fixing portion of the case and the fitting portion of the second positioning portion being fitted to the mounting hole of the case, the mounting position accuracy when the resolver stator is mounted on the case is improved. Furthermore, since the resolver stator is positioned by the fitting portion of the second positioning portion, the gap for absorbing the dimensional tolerance provided between the outer peripheral surface of the fitting portion and the inner peripheral surface of the mounting hole of the case can be reduced. Thereby, the sealing property between the outer peripheral surface of the fitting portion and the inner peripheral surface of the mounting hole of the case by the sealing member is improved and the crushing margin of the sealing member is reduced, so that deterioration of the sealing member can be suppressed.

(2) The rotating electrical machine unit according to (1), in which the first positioning portion is provided on an opposite side to the second positioning portion with respect to the rotating shaft when viewed from the direction of the rotating shaft.

According to (2), since the first positioning portion is provided on the side opposite to the second positioning portion with respect to the rotating shaft when viewed from the direction of the rotating shaft, the distance between the first positioning portion and the second positioning portion is increased, and thus the positioning accuracy when the resolver stator is attached to the case is improved.

(3) The rotating electrical machine unit according to (2), in which the first positioning portion is provided at a position substantially symmetrical to the second positioning portion with respect to the rotating shaft when viewed from the direction of the rotating shaft.

According to (3), since the first positioning portion is provided at the position substantially symmetrical to the second positioning portion with respect to the rotating shaft when viewed from the direction of the rotating shaft, the distance between the first positioning portion and the second positioning portion is increased, and thus the positioning accuracy when the resolver stator is attached to the case is further improved.

(4) The rotating electrical machine unit according to any one of (1) to (3), in which a front end portion (front end portion 78F) located on the one side of the knock portion and an end portion (front end portion 84F) located on the one side of the fitting portion are arranged to be in different positions in the direction of the rotating shaft.

According to (4), the front end portion located on one side of the knock portion and the end portion located on one side of the fitting portion are arranged to be in different positions in the direction of the rotating shaft. Therefore, the operation of fixing the knock portion of the first positioning portion to the knock fixing portion of the case and the operation of fitting the fitting portion of the second positioning portion to the mounting hole of the case can be performed separately, and thus it becomes easy to attach the resolver stator to the case.

(5) A resolver stator (resolver stator 70), including:

a stator portion (stator portion 71) having a substantially annular shape:

a telegraph connector portion (telegraph connector portion 80) extending radially outward from the stator portion and protruding to one side (front side) in a central axis (central axis CR) direction of the stator portion; and a first positioning portion (first positioning portion 77) extending radially outward from the stator portion and including a knock portion (knock portion 78) protruding to the one side, in which the telegraph connector portion includes a second positioning portion (second positioning portion 81) having a fitting portion (fitting portion 84) with a sealing member (sealing member 86) on an outer peripheral surface and an external connection portion (external connection portion 89) protruding from the second positioning portion to the one side.

According to (5), since the resolver stator can be fixed to the case by being positioned with the knock portion of the first positioning portion and the fitting portion of the second positioning portion which are fixed to the case, the mounting position accuracy when the resolver stator is mounted on the case is improved. Furthermore, since the resolver stator is positioned by the fitting portion of the second positioning portion, the shape of the outer peripheral surface of the fitting portion can be made into a shape with a small margin for absorbing dimensional tolerances.

(6) The resolver stator according to (5), in which the first positioning portion is provided on an opposite side to the second positioning portion with respect to the central axis when viewed from the central axis direction.

According to (6), since the first positioning portion is provided on the opposite side to the second positioning portion with respect to the central axis when viewed from the central axis direction, the distance between the first positioning portion and the second positioning portion is increased, and thus the positioning accuracy when the resolver stator is attached to the case is improved.

(7) The resolver stator according to (6), in which the first positioning portion is provided at a position substantially symmetrical to the second positioning portion with respect to the central axis when viewed from the central axis direction.

According to (7), since the first positioning portion is provided at the position substantially symmetrical to the second positioning portion with respect to the central axis when viewed from the central axis direction, the distance between the first positioning portion and the second positioning portion is increased, and thus the positioning accuracy when the resolver stator is attached to the case is further improved.

(8) The resolver stator according to any one of (5) to (7), in which a front end portion (front end portion 78F) located on the one side of the knock portion and an end portion (front end portion 84F) located on the one side of the fitting portion are arranged to be in different positions in the central axis direction.

According to (8), since the front end portion located on one side of the knock portion and the end located on one side of the fitting portion are arranged to be in different positions in the central axis direction, the operation of fixing the knock portion of the first positioning portion to the case and the operation of fixing the fitting portion of the second positioning portion to the case can be performed separately, and thus it becomes easy to attach the resolver stator to the case.

The invention claimed is:

1. A rotating electrical machine unit comprising:
   a rotating electrical machine having a rotating shaft;
   a resolver which includes a resolver rotor attached to the rotating shaft or a rotating member which rotates together with the rotating shaft and a resolver stator arranged so as to surround a radial outer side of the resolver rotor; and
   a case which accommodates the rotating electrical machine and the resolver, wherein:
   the resolver stator includes:
   a stator portion having a substantially annular shape disposed opposite to the radially outer side of the resolver rotor;
   a telegraph connector portion extending radially outward from the stator portion and protruding to one side in a direction of the rotating shaft; and
   a first positioning portion extending radially outward from the stator portion and including a knock portion protruding to the one side;
   the case has a mounting hole through which the telegraph connector portion passes and a knock fixing portion to which the knock portion is fixed;
   the telegraph connector portion includes a second positioning portion having a fitting portion fitted to the mounting hole and having a sealing member on an outer peripheral surface and an external connection portion protruding from the second positioning portion to the outside of the case on the one side; and
   the resolver stator is attached to the case by being positioned with the knock portion of the first positioning portion being fixed to the knock fixing portion of the case and the fitting portion of the second positioning portion being fitted into the mounting hole of the case.

2. The rotating electrical machine unit according to claim 1, wherein
the first positioning portion is provided on an opposite side to the second positioning portion with respect to the rotating shaft when viewed from the direction of the rotating shaft.

3. The rotating electrical machine unit according to claim 2, wherein
the first positioning portion is provided at a position substantially symmetrical to the second positioning portion with respect to the rotating shaft when viewed from the direction of the rotating shaft.

4. The rotating electrical machine unit according to claim 1, wherein
a front end portion located on the one side of the knock portion and an end portion located on the one side of the fitting portion are arranged to be in different positions in the direction of the rotating shaft.

5. A resolver stator, comprising:
a stator portion having a substantially annular shape;
a telegraph connector portion extending radially outward from the stator portion and protruding to one side in a central axis direction of the stator portion; and
a first positioning portion extending radially outward from the stator portion and including a knock portion protruding to the one side, wherein
the telegraph connector portion includes a second positioning portion having a fitting portion with a sealing member on an outer peripheral surface and an external connection portion protruding from the second positioning portion to the one side.

6. The resolver stator according to claim 5, wherein
the first positioning portion is provided on an opposite side to the second positioning portion with respect to the central axis when viewed from the central axis direction.

7. The resolver stator according to claim 6, wherein
the first positioning portion is provided at a position substantially symmetrical to the second positioning portion with respect to the central axis when viewed from the central axis direction.

8. The resolver stator according to claim 1, wherein
a front end portion located on the one side of the knock portion and an end portion located on the one side of the fitting portion are arranged to be in different positions in the central axis direction.

* * * * *